June 24, 1930.  C. R. FISHER ET AL  1,767,749
METHOD OF PROTECTING SHIPS FROM COLLISIONS
AND RADIO APPARATUS THEREFOR
Filed Sept. 19, 1927  2 Sheets-Sheet 1
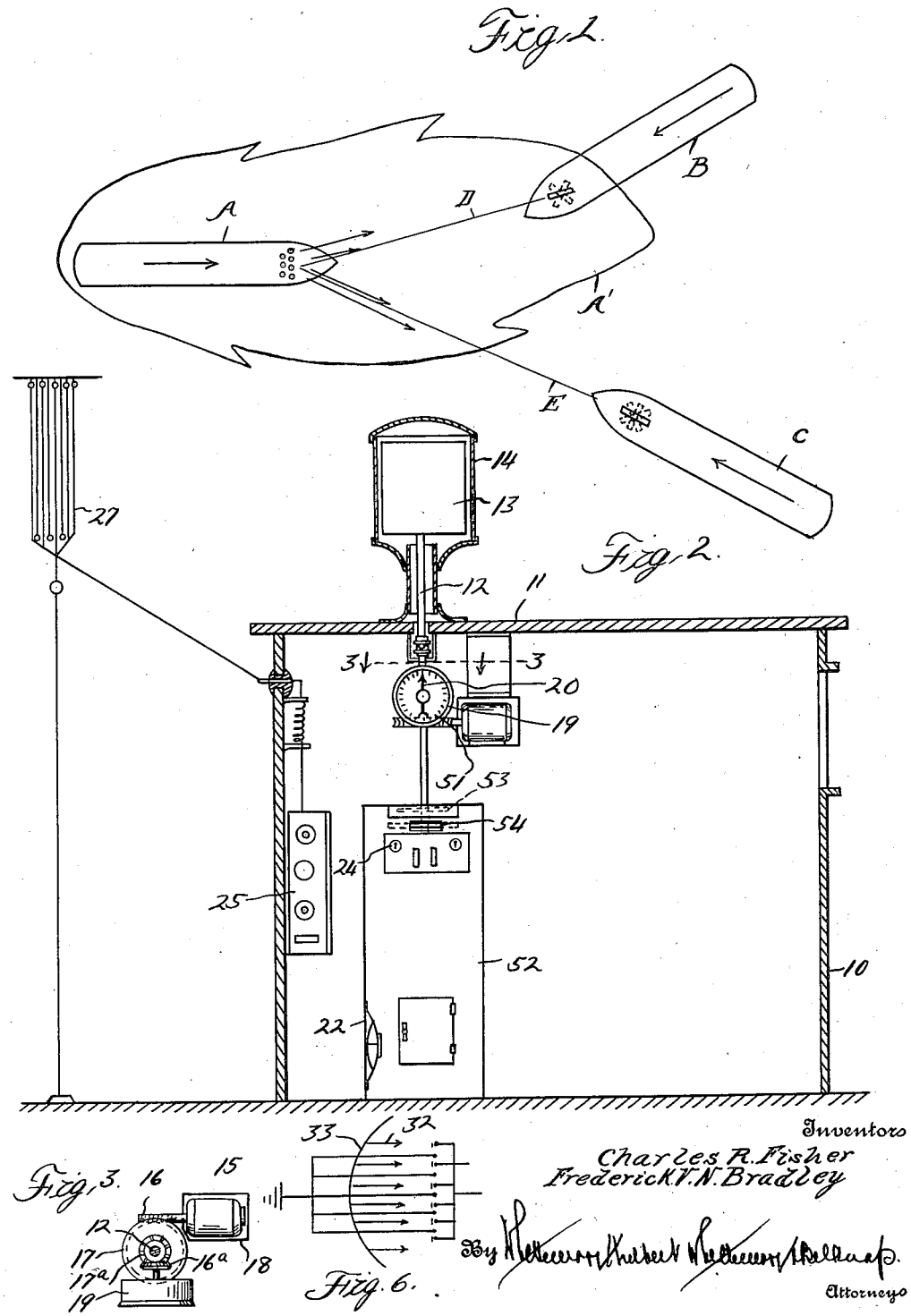

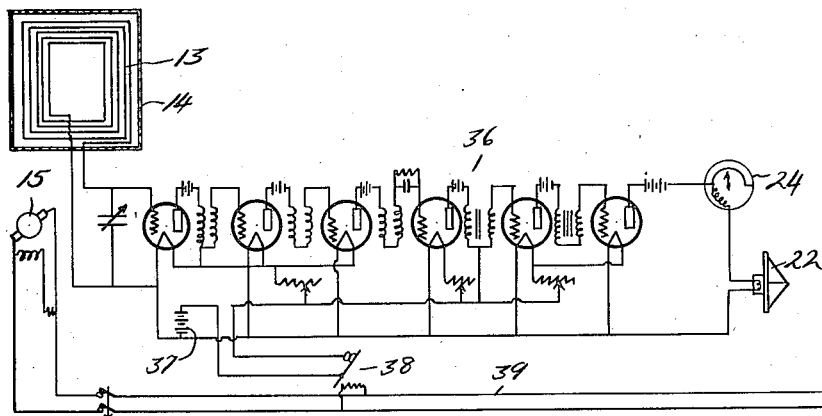
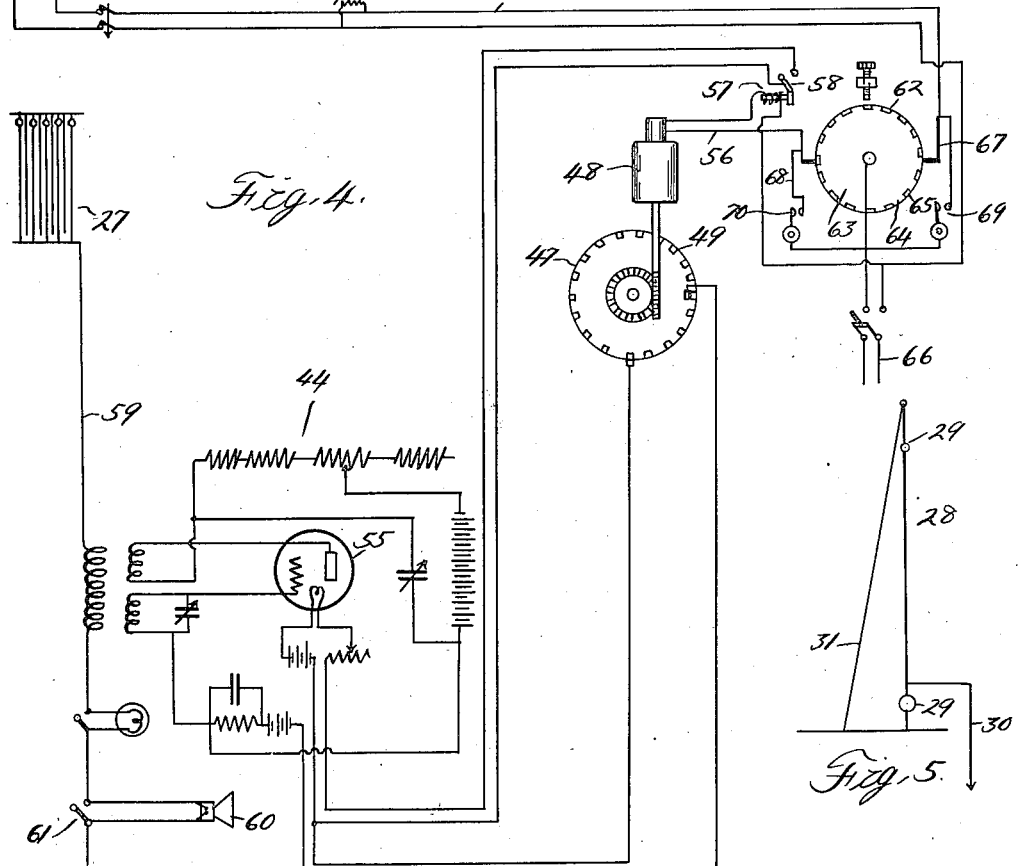
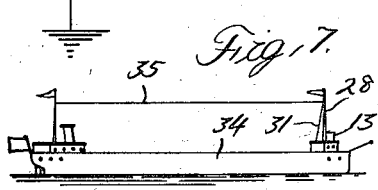

Patented June 24, 1930

1,767,749

UNITED STATES PATENT OFFICE

CHARLES R. FISHER AND FREDERICK V. N. BRADLEY, OF ROGERS CITY, MICHIGAN

METHOD OF PROTECTING SHIPS FROM COLLISIONS AND RADIO APPARATUS THEREFOR

Application filed September 19, 1927. Serial No. 220,563.

The invention relates to a method of insuring safe navigation of ships, particularly under conditions of low visibility, whether the ships be on or under the water or in the air, and the method is intended primarily to automatically apprize the master of any ship the approximate location and the direction of movement of any other ship within a definite range in order that collisions between the ships may be avoided.

The system in general comprises the arrangement of a transmitting and receiving radio set on each of the moving ships, the sets being so constructed and arranged that each ship periodically creates an electromagnetic field around the same which can be detected by the receiving apparatus of any other ship within a certain range and translated into an intelligible signal. The transmitting apparatus may be of any of the conventional types operated on any predetermined frequency or band of frequencies, although in the preferred arrangement it is desirable to employ a beam directional apparatus whereby the electromagnetic field extends for the greatest distance in the direction of travel of the vessel. Means is provided for periodically sending out certain intelligence waves such as a distinctive code of dots or dashes which will or may identify the particular ships to all ships within the range that are provided with a radio receiving set.

The receiving apparatus may also be of the conventional types, but is equipped with some form of radio direction-finding system whereby it is possible to indicate the direction from which the received signals have emanated. The receiving set is tuned into resonance with the frequency or band of frequencies on which the transmitting set operates and is provided with means for automatically revolving a direction-finding apparatus and means for indicating the intensity of the received signals.

Within such a system whenever two or more ships approach within the range of the radio instruments, each will be apprized of the location of the other ships and as the ships approach each other more closely, the approximate course and the distance of the various ships may be determined so that if necessary the courses of one or more of the ships may be shifted to avoid collision. This system may be used to replace the fog horn system now in general use and has many advantages over the latter.

In the drawings:

Figure 1 illustrates diagrammatically the relation of a plurality of ships at sea and the method by which the location of the respective ships may be determined;

Figure 2 illustrates one form of apparatus for carrying out the system;

Figure 3 is a transverse section on the line 3—3 of Figure 2;

Figure 4 is an electrical diagram of the transmitting and receiving apparatus illustrating the automatic operation thereof;

Figure 5 is an elevation of a beam directional antenna;

Figure 6 is a plan view thereof;

Figure 7 is a side elevation of a vessel showing the location of the various antennæ.

Referring now to Figure 1, suppose that the ships A, B and C are each provided with a periodically operated radio transmitter having a predetermined range, say, for example, five to ten miles in extent. If the transmitter is of the beam directional type the magnetic field created thereby will be a maximum in the direction of travel of the ship. Thus the ship A would be surrounded by a magnetic field, the outline of which is diagrammatically represented by A'. Each of the ships is also provided with a direction-finding radio receiving apparatus by means of which the direction of the received signals relative to the course of travel of the ship may be determined. The ships A and B being within range of each other each receive the periodic signals of the other ship and each may determine the approximate location of the other by knowing the angular position of the direction finder corresponding to the maximum intensity of reception. Thus in the positions shown in full lines the ship A will know that ship B is at an angle D with respect to its own course, while ship B will know that ship A is at an angle E.

As the vessels continue on their respective courses and approach each other more closely the angles D and E will vary so that each ship may determine the approximate course of the other and be governed accordingly. The ship C being outside of the range of A will receive no radio signals until it approaches more closely and enters the magnetic field A'.

In the practical operation of a system as generally described above it is desirable to provide each ship with a combined transmitting and receiving apparatus, which is automatically operated and provided with indicators arranged in convenient locations in the pilot house so that the information of the approaching ships is at all times available to the pilot. As an example of the arrangement of the apparatus, Figure 2 represents a sectional elevation of the pilot house 10, through the top 11 of which projects a shaft 12 for supporting a balanced loop wound rotatable antenna 13. This antenna is preferably arranged within a protecting housing 14 of suitable insulating material. The shaft 12 is adapted to be automatically revolved by means of a motor 15 connected to the shaft by suitable gearing such as the worm 16 and worm wheel 17. The motor 15 is enclosed within a housing 18 of copper or other suitable metal for shielding the motor to prevent interference with the radio receiving apparatus. For indicating the angular position of the loop antenna there is provided an indicator 19, which as shown comprises a dial 51 graduated in degrees of rotation and a pointer 20 geared to the shaft 12 by bevel gears 16ª and 17ª in such a manner as to indicate the angular position of the loop antenna relative to the direction of the ship. Preferably the calibration of the dial 51 is such that the pointer always indicates the angular position of the plane of the loop with reference to the longitudinal axis of the ship, so that whenever the strength of a receiving signal is at its maximum the operator can refer directly to the dial reading to obtain the position of the approaching ship.

The shaft 12 continues downwardly to a pedestal 52, in the top of which is arranged a horizontal indicating dial 53 adapted to be rotated by the shaft. The calibration of this dial is such that the angular position of a plane at right angles to the plane of the loop is indicated. This indicator corresponds to an ordinary radio direction finder and is provided for the purpose of permitting manual determination of a ship's position in the conventional manner where minimum signal strength is the criterion of the position. Under such conditions continuous rotation of the loop by the motor 15 is stopped and the angular position adjusted by the hand wheel 54.

The receiving apparatus may conveniently be housed within the pedestal 52 which is adapted to contain the batteries, the loud speaker 22 and the cabinet 21 for the tubes, condensers, etc. The receiving apparatus may comprise any conventional radio set having the usual controls and indicators. However, the apparatus is preferably provided with a visible indicator for the signal strength which may be a milliammeter 24 arranged in the last plate circuit of the apparatus. Thus the milliammeter indicates visibly and the loud speaker indicates audibly the strength of the received signals.

The radio transmitting apparatus is preferably arranged in a cabinet 25 within the pilot house and leads to the transmitting antenna 27. The antenna is preferably of the beam directional type and as shown in Figure 7 is arranged at the forward end of the ship. While any suitable form of antenna may be employed I have illustrated a specific arrangement in Figures 5, 6 and 7 wherein the antenna comprises a series of vertical conductors 28 supported on the forward mast of the boat and arranged in a plane extending transversely of the boat. The conductors are suitably insulated from the supporting structure by the insulators 29 and are connected by the lead-in conductor 30 to the transmitting circuit. Spaced intermediate the respective conductors 28 and arranged in a plane slightly to the rear of the plane of the conductors 28 are a series of conductors 31, the upper ends of which are secured to the mast. These conductors 31 are electrically grounded and act as a grounded reflector which increases the intensity of transmission in the direction of movement of the ship. This action is diagrammatically illustrated in Figure 6 by the arrows 32 extending from an imaginary parabolic reflector illustrated at 33. The directional antenna as so far described is not in itself our invention and is included in the description and illustration only to show the relationship of the antenna to the other elements of the apparatus. As shown in Figure 7, the directional antenna is at the forward end of the boat 34. The direction-finding antenna 13 is also at the forward end on top of the pilot house and the regulation antenna for ordinary radio communication extends horizontally between the forward and rearward masts, as indicated at 45.

In the electrical diagram represented in Figure 4 the numeral 36 represents generally the receiving apparatus including the loop antenna 13, the milliammeter 24 and loud speaker 22. The receiving apparatus derives its power from an A battery 37 or equivalent apparatus and is controlled by a relay 38 arranged in a power circuit 39. The transmitting apparatus is indicated generally by the numeral 44, and as shown includes the directional antenna 27, the power tube 55, the antenna circuit 59, inductories, capacities, etc. The sending of code signals is controlled by the key circuit 46 which is opened and closed by means of an automatically operated contact disk 47. This disk is revolved by means of a motor 48 deriving its power from the circuit 56. The disk 47 has the surface thereof interrupted by inserts 49 of insulating material, the arrangement being such that the key circuit is interrupted to correspond with a predetermined code signal, which may be the same for all ships equipped with an apparatus of the type described or may be slightly different for each ship, thus identifying the particular ship transmitting. The circuit 56 includes a relay 57 which when energized closes a switch 58 in the filament circuit 45 of the power tube 35, thus controlling the operation of the transmitting apparatus. Preferably the transmitting apparatus is designed to be operated as a radio telephone when desired so that speech may be transmitted instead of code signals. This is diagrammatically illustrated by showing the microphone 60 which may be placed in series with the antenna circuit 59 by opening the manually operable normally closed switch 61.

As previously stated it is desirable to have the transmitting and receiving apparatus automatically operated at predetermined timed intervals, and this is preferably accomplished by controlling the transmitting control circuit 56 and the receiving control circuit 39 from a time clock switch mechanism 62. As diagrammatically illustrated the switch mechanism 62 includes a disk 63 operated by clock work mechanism (not shown) and having alternatively arranged on its periphery the conducting segments 64 and the insulating segments 65. The main power circuit 66 is connected to the circuits 39 and 56 through the disk 63 by means of contact arms 67 and 68 respectively which bear against the disk. The contact arms are arranged so that when one bears on a conducting segment the other bears on an insulating segment, and vice versa so that as the disk is rotated the transmitting and receiving apparatus is alternately energized. Manually operated switches 69 and 70 are also provided for controlling the respective circuits independently of the time clock mechanism when desired.

While we have indicated in Figure 4 an electrical diagram for connecting a transmitting and receiving set for automatic operation in accordance with our invention it will of course be understood that many modified arrangements might be employed to obtain the same general results. Since the illustration of commercial types of transmitting and receiving sets involves a complicated layout not necessary for a complete understanding of my invention, we have purposely shown simplified forms of apparatus by means of which my invention is more readily explained.

With the apparatus as above described having the indicating instruments in the pilot house of the ship, it will be apparent that when the receiving apparatus is in operation the loop 13 will be automatically rotated through a complete revolution and if the ship is within the range of another vessel the signals on the other vessel will be audibly indicated by the loud speaker during some portion of the revolution of the loop antenna. The intensity of the received signals will vary according to the angular position of the loop and the operator by noting the angular position corresponding to the maximum intensity can determine the general direction from which the received signals have emanated. During the period when the receiving apparatus is not in operation, the ship is automatically transmitting its particular code, which in turn can be received by other ships within range. As the ships approach one another each pilot will know the approximate course of the other ship and if there is danger of collision, each can change course of his own ship to avoid the other. When it is necessary to very accurately determine the direction of the received signals, the motor 15 may be thrown out of operation by the switch 41 and the antenna 13 may be manually adjusted to accurately determine the angular position of the sending station on the dial 53.

What we claim as our invention is:

A device for protecting moving ships from collisions comprising a radio transmitter adapted to emanate directional radio waves having the greatest range in the direction of movement of the ship, a radio receiver tuned in resonance with said transmitter, a direction indicating antenna operatively connected to said receiver, means for indicating the angular position of said antenna relative to the direction of travel of the ship, means for indicating the intensity of the received signals, means for automatically rotating said antenna for a predetermined interval, and means for alternately operating said transmitter during the remaining intervals.

In testimony whereof we affix our signatures.

CHARLES R. FISHER.
FREDERICK V. N. BRADLEY.